(12) United States Patent
Ehrgott

(10) Patent No.: US 11,286,699 B2
(45) Date of Patent: Mar. 29, 2022

(54) TRAILER DOOR RAMP LIFT ASSIST DEVICE

(71) Applicant: Glenn Ehrgott, Flanders, NJ (US)

(72) Inventor: Glenn Ehrgott, Flanders, NJ (US)

( * ) Notice: Subject to any disclaimer, the term of this patent is extended or adjusted under 35 U.S.C. 154(b) by 146 days.

(21) Appl. No.: 16/659,892

(22) Filed: Oct. 22, 2019

(65) Prior Publication Data

US 2020/0123829 A1 Apr. 23, 2020

Related U.S. Application Data

(60) Provisional application No. 62/748,580, filed on Oct. 22, 2018.

(51) Int. Cl.
| | | |
|---|---|---|
| *E05F 1/10* | (2006.01) | |
| *B60P 1/43* | (2006.01) | |
| *B60J 5/10* | (2006.01) | |

(52) U.S. Cl.
CPC ............ *E05F 1/1041* (2013.01); *B60J 5/108* (2013.01); *B60P 1/435* (2013.01); *E05Y 2900/516* (2013.01); *E05Y 2900/531* (2013.01)

(58) Field of Classification Search
CPC ......... E05F 1/1041; B60P 1/425; B60P 1/435; B60J 5/108; E05Y 2900/531; E05Y 2900/516
See application file for complete search history.

(56) References Cited

U.S. PATENT DOCUMENTS

| | | |
|---|---|---|
| 5,954,383 A | 9/1999 | Beck |
| 6,068,324 A | 5/2000 | DeKlotz |
| 6,135,532 A | 10/2000 | Martin |
| 6,905,156 B2 | 6/2005 | Miller et al. |
| 7,036,863 B2 | 5/2006 | Hunter |
| 7,213,860 B2 | 5/2007 | Brenneman et al. |
| 7,347,476 B2 | 3/2008 | Luehr et al. |
| 8,061,954 B2 | 11/2011 | Lambright |
| 8,347,440 B1 | 1/2013 | Runyon |
| 9,090,199 B2 | 7/2015 | Gunby |
| 9,102,482 B2 | 8/2015 | Levi |
| 9,550,444 B1 | 1/2017 | Ferreira |
| 2006/0220410 A1* | 10/2006 | Luehr ............... B62D 33/03 296/61 |
| 2010/0037528 A1* | 2/2010 | Lambright ........... B60P 1/438 49/347 |

* cited by examiner

*Primary Examiner* — D Glenn Dayoan
*Assistant Examiner* — Melissa Ann Bonifazi
(74) *Attorney, Agent, or Firm* — Baldini Law, LLC

(57) ABSTRACT

A trailer door that opens by hinging downward to double as a ramp for loading/unloading cargo and an improved assistive means by which such doors are opened and closed is provided. An assembly comprising a ramp pull point that is set apart from the plane of the ramp/door, and/or is moved outward from its edge, changes the physics of the tension required for the assistive lift force for any given ramp/door which in turn allows the spring or cabling counter-weight mechanism to be deployed substantially removing it from blocking the sides of the ramp/door.

4 Claims, 16 Drawing Sheets

TRAILER DOOR RAMP LIFT ASSIST DEVICE

This application claims priority to Provisional Application Ser. No. 62/748,580 filed on Oct. 22, 2018, which is incorporated herein as if fully set forth.

FIELD OF THE INVENTION

A trailer door that opens by hinging downward to double as a ramp for loading/unloading cargo and an improved assistive means by which such doors are opened and closed is provided. An assembly comprising a ramp pull point that is set apart from the plane of the ramp/door, and/or is moved outward from its edge, changes the physics of the tension required for the assistive lift force for any given ramp/door which in turn allows the spring or cabling counter-weight mechanism to be deployed substantially removing it from blocking the sides of the ramp/door.

BACKGROUND

Trailers for the transport of landscaping equipment, motor vehicles, cars, quads, appliances, or motorcycles or other heavy cargo typically embody a rear trailer door that opens by unfolding at a bottom hinge wherein the door opens such that the top of the door unfolds and meets the ground creating the base of a ramp to facilitate loading cargo into the trailer. In a landscaping use, small tractors and backhoes can be driven up the ramp and into the trailer. Motorcycle and other quad or recreational vehicles are similarly loaded for transport. In other instances, a person will simply walk carrying cargo up the ramp and into the trailer.

In each of these instances, it is imperative that the door, when functioning as a ramp as described, is sturdy and capable of supporting the heavy weight that is loaded across it. When closed and functioning as a door, the door must also be sturdy and resistant to any of the interior cargo becoming dislodged during transport and smashing through the door. Such a ramp/door configuration requires a sturdy structure which is inherently heavy, although this disclosure also teaches methods of increasing ramp/door strength and integrity while minimizing mass.

To assist the opening of such a heavy ramp/door structure and prevent its opening quickly and swinging down uncontrolled and potentially injuring the person opening it, as well as to assist a person trying to close it and make the lifting of the weight manageable, it is beneficial to use a spring or other counter-weight mechanism to help compensate for the weight of the ramp/door and to make it easier and safer to open and close.

Typically, known springs and other counter-weight mechanisms that are in use to assist with ramp/door opening and closing (and used similarly in other installations such as windows) require one end to have an attachment along the length of both sides of the ramp/door and another attachment point either on the trailer opening or within a recess within the trailer walls. The attachment point along the length of the sides of the ramp/door is typically positioned more towards the top of the door (away from the hinged portion connecting the ramp/door to the trailer) so as to optimize leverage. While effective, one of the negatives of this arrangement is that it creates a blocking tension spring or pull cable on both sides of the ramp/door such that cargo must be loaded straight in and out of the back of the trailer and also causes a tripping hazard for anyone attempting to step into or out of the trailer from the side of the opening.

Attempts have been made to reduce or eliminate this negative drawback. For example, in U.S. Pat. No. 7,213,860, titled COMPOSIT CARGO DOOR/RAMP, disclosed is, "a cargo enclosure including a floor having a plurality of edges including a first edge, a second edge and third edge. At least two sidewalls, including a first sidewall and a second sidewall, the first sidewall connected to the first edge of the floor, the second sidewall connected to the second edge of the floor. At least one hinge is connected along the third edge of the floor, the at least one hinge being rotatable about an axis. A composite door is connected to the at least one hinge, the door having a closed position and the hinge having a plurality of torsion springs rotatable about the axis, the plurality of torsion springs biasing the composite door toward the closed position." Here, in order to be effective, this invention "provides a lightweight composite door." This invention describes its advantages to include, "the composite structure of the door is lightweight yet strong enough to allow the weight of cargo and vehicles to traverse the ramp surface" and yet "light enough to not require cables to lift the door into a closed position."

In another example, U.S. Pat. No. 6,068,324, titled CARGO SYSTEM INCLUDING MULTIPLE FUNCTION SEALING PASSAGES, disclosed is a "cargo system according to the present invention may include a roof passage having a weather tight hinging mechanism. A roof passage panel is configured having an 'h-shaped' edge member pivotably attached to a hinge allowing for movement of the panel between a first or closed position wherein the hinge mechanism is sealed in a weather tight manner, a second or 'un-opened' position wherein the roof passage panel is oriented in a substantially vertical position above the roofline of the cargo system, and third or 'down-opened' position, wherein the roof panel is oriented again in a substantially vertical position below the roofline of the cargo system. The cargo system including multiple function sealing passages may also include a ramp/hatch passage which allows access to the cargo system, typically via the rear panel. The ramp/hatch passage is configured to permit access to the bed of the vehicle via the ramp/hatch passage, which may be opened as a hatch or alternately as a ramp."

In another example, in U.S. Pat. No. 7,036,863, titled RECREATION VEHICLE RAMP DOOR SPRING ARRANGEMENT, disclosed is an, "assembly comprising at least two structural members moveably coupled to each other, each structural member being coupled to opposite ends of a bias member biasing the at least two structural members to move towards or away from each other, wherein one or more of the at least two structural members form a bias member receiving recess and the structural members and bias member are coupled together in such a manner that moving one structural member relative to the other structural member causes the bias member to rotate at least partially into or at least partially out of the bias member receiving cavity."

Other examples address configurations for assisting with loading and/or unloading cargo from the bed of a trailer, such as lift systems. See for example U.S. Pat. Nos. 9,550, 444; 8,347,440; and 9,102,482. Other examples address configurations of cargo vehicle closure involving complicated pulleys, tension mechanisms, or hydraulics and may or may not include ramp devices. See for example U.S. Pat. Nos. 9,090,199; 8,061,954; and 6,905,156.

The prior art and the industry has for a long time attempted to find a solution for a solid, sturdy and fully supportive rear trailer door that can double as a loading ramp for even the heaviest equipment and be simple to open and close and overcome the obtrusive (by eliminating the obstruction that is caused by) support cables or springs that block the side entry when in an open position. While pre-existing methods of counter-weighting a ramp door include using tension springs or torsion bars at the hinge area, leaf springs, air bags, and electro-magnetic force through a series of gears, the desire is to do away with the tension members that, in the present form, pass through the frame opening that surrounds the ramp, thereby removing the obstruction of the ramp frame opening essentially rendering it wider. However, in all of these attempts, the shortfalls include that they are expensive and/or complicated to implement and the performance is not as good as the simpler tension member counter-weight methods that cause the obstruction.

It is an object of this disclosure to employ physics by focusing on the locations of the connections of a tension member to counter-weight a ramp/door, the locations of: (a) the connection point on or along the ramp/door, or set out from the edge of the ramp/door; and (b) the connection point at an aperture in the rear frame of the trailer to which the ramp/door is hinged that defines the opening. This disclosure proposes alternative approaches adopting proven methods of efficiently and effectively counter-balancing a ramp/door, but improving them by relocating the attachment points—first by relocating an attachment point at or near a point along the ramp/door itself, and second by removing the tension member from inside the ramp frame opening and/or relocating it.

Methods contemplated herein may use one or more lift assist tension members. The tension members may consist of a steel cable, a chain, fabric webbing, rope or other suitable material. The tension member can be under tension be many known methods including but not limited to, a tension spring, a compression spring, gas spring, torsion spring, electromagnetic force, or simple counter-weight. The focus described herein is not on the type of tension, but rather on how and where connections are made.

This disclosure capitalizes on the physics of locations of salient components and connections and the actual mechanism of those connections to capitalize on effective lever locations to increase leverage while minimizing obstruction.

Here, in one embodiment, the disclosure teaches that the location of a connection of a tension member to the ramp/door defines a pull point and the location of the opposite end of a tension member in the rear frame of the trailer defines a second pull point. The locations of the two described pull points relative to each other and a pulley-point of connection of those two prior defined points, define the tension needed to lift and/or support the weight or a portion of the weight of the ramp/door. By manipulating the pull points described, the tension requirement is affected and by manipulating appropriately, the tension requirement can be achieved with pull points that are unobtrusive to the ramp/door—trailer opening area so as to remove the common place obstruction caused by a tension cable that is simply connected at a point along the ramp/door and at a point along the rear trailer frame opening.

This has several advantages over the prior art. Firstly, there is still accomplished a counter-weighting of a ramp/door so as to make its opening and closing easy for one person to accomplish unassisted. Second, without losing any of the benefits of the assisted counter-weighting, the obstruction typically caused by normal tension springs or cords or cabling is eliminated without any sacrifice in the tension created or overall strength or durability of the ramp/door. In fact, even heavier than normal doors can be accommodated.

None of the disclosed prior art references or other known prior art, alone or in combination, teach the salient and proprietary features of the present disclosure as just described.

SUMMARY

The present disclosure teaches embodiments of tension mechanism for the rear ramp/door of a trailer hinged at its bottom to assist with its opening and closing and eliminating or reducing any obstruction on the side of the ramp/door into the rear opening of the trailer without sacrificing any strength of the tension mechanism or requirement for the ramp/door to be of a lighter weight than normal.

DETAILED DESCRIPTION

For clarity of disclosure, and not by way of limitation, the detailed description of the invention is divided into the following subsections that describe or illustrate certain features, embodiments or applications of the present invention.

Definitions

"ramp/door" (and can be interchangeable with "door/ramp" as used herein means a door as affixed to the rear of a trailer (or any opening of a trailer where loading/unloading is intended) where said door is hinged or attached with locating pins or bolts at its bottom so that it opens with its top end extending to rest on the ground or other suitable lower surface to double function as a ramp.

"pull point" as used herein means a point at which a tension mechanism is affixed to either a ramp/door or a trailer frame or wall to create a lift assist tension to assist a user in opening or closing the ramp/door.

"tension mechanism" as used herein means any counterbalance mechanism that is used to create an assistive tension to reduce the effective weight of a ramp/door to assist a user in opening or closing the ramp/door.

"pull cable" as used herein means any cable, cord, wire, rope or other similar type structure having a length with a first end and a second end for attaching at one end to the pull point and its opposite end to a tension mechanism.

"flange" as used herein means a wing tab type extension that can be retrofitted to any existing ramp/door or simply added to the original configuration of a newly constructed ramp/door to widen the ramp/door at a desired location on either or both sides to create an attachment point for a pull cable at a pull point.

The System and Method of the Present Invention

In one embodiment, recognizing the inconvenience, and potential to cause damage, of a tension device attached to the ramp/door via an anchor point along its edge, and passing inside the rear trailer frame, because of the effective narrowing of the opening in this configuration, this disclosure teaches that by spreading the attachment areas, effectively removing and distancing it from the plane of the ramp/door, and providing one or more openings (an aperture or portal) for the connection of the opposite end of a tension member, the effective opening at the rear of the trailer can be effectively larger.

In one embodiment, the ramp/door will either be wider than the opening, or have wings or partial flanges, or full height additional width flanges that provide for attaching an anchor point for a counter-weight tension member at a width wider or greater that the ramp/door frame opening. In one embodiment, the wings or partial flanges can be hinged with a spring mechanism to unfold them into the proper orientation when in use.

Figure 1:
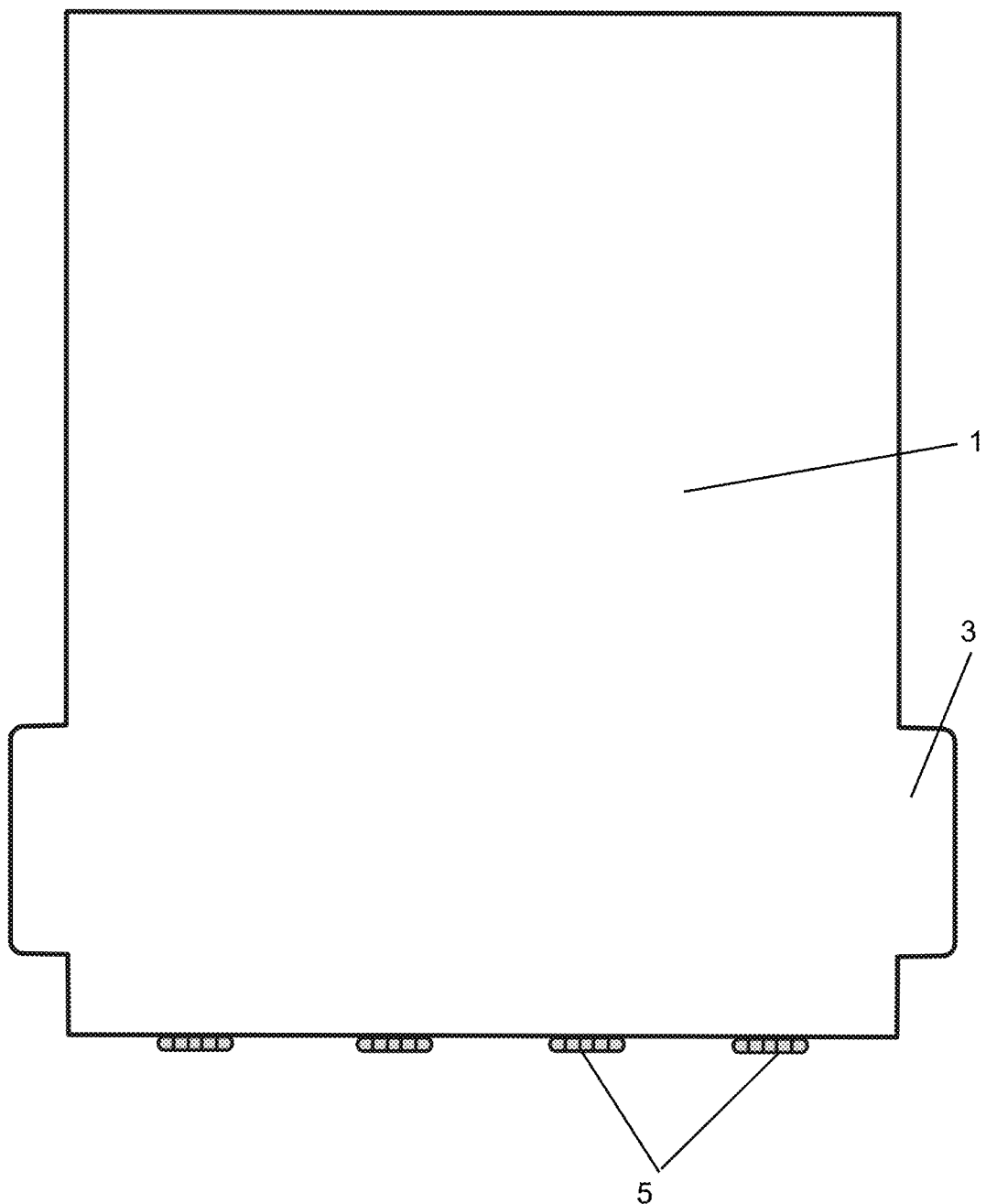
FIG. 1 depicts a view of one embodiment of the outside of a ramp/door (1) showing hinges (5) at its bottom for connecting to a rear frame opening (not shown) of a trailer, and also showing wing tabs (3).

In one embodiment, referring to FIG. 1, the attachment point of a tension member to the ramp/door is moved out from the plane of the ramp/door to a point on a wing tab (3) either wider in the same plane, or at a distance below the plane of the ramp/door.

In one embodiment, the attachment points created by the wings or flanges (3), can be created through the use of springed hinges (not shown) that allow the wings or flanges to open up when the ramp/door is in the open position effectively pushing the entire tension members out to the side.

Figure 2:
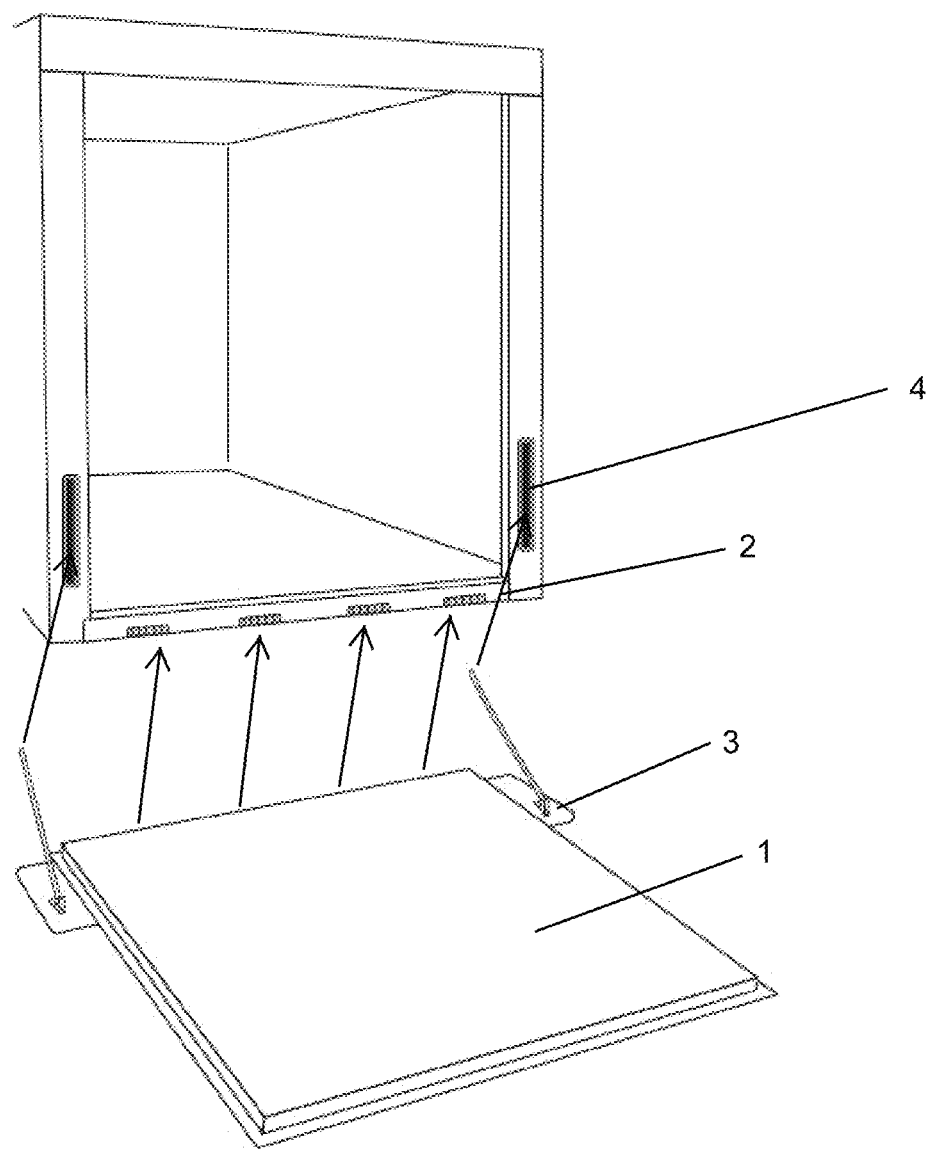
FIG. 2 depicts a view of one embodiment of the outside of the back of an open position perspective view of a ramp/door (1) hinged at its bottom (but detached for easy viewing) to a rear frame opening of a trailer (2) with appropriate pull points defined at a positioned wing tab (3) on either side of the ramp/door and where that pull point would meet its corresponding pull point in an opening of the rear frame of the trailer (4).
Figure 3:
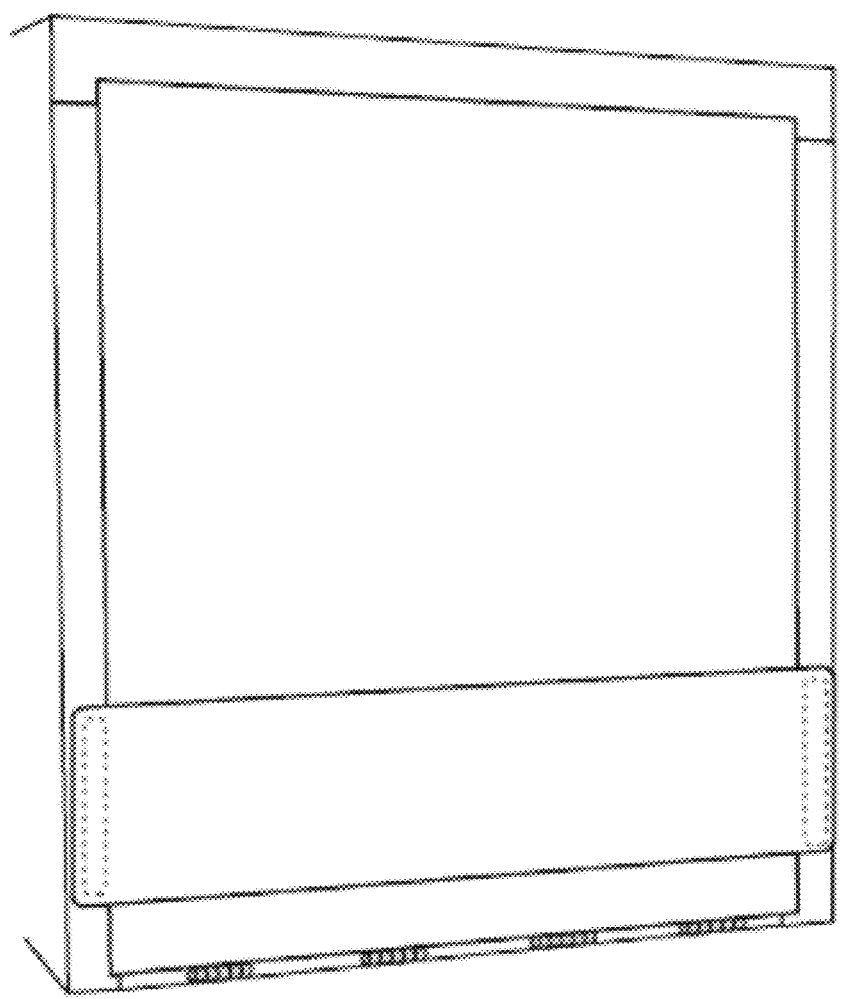
FIG. 3 depicts one embodiment of a ramp/door with wing tabs as depicted in the embodiment shown in FIG. 1 attached and in closed position in a rear frame opening of a trailer.
Figure 4:
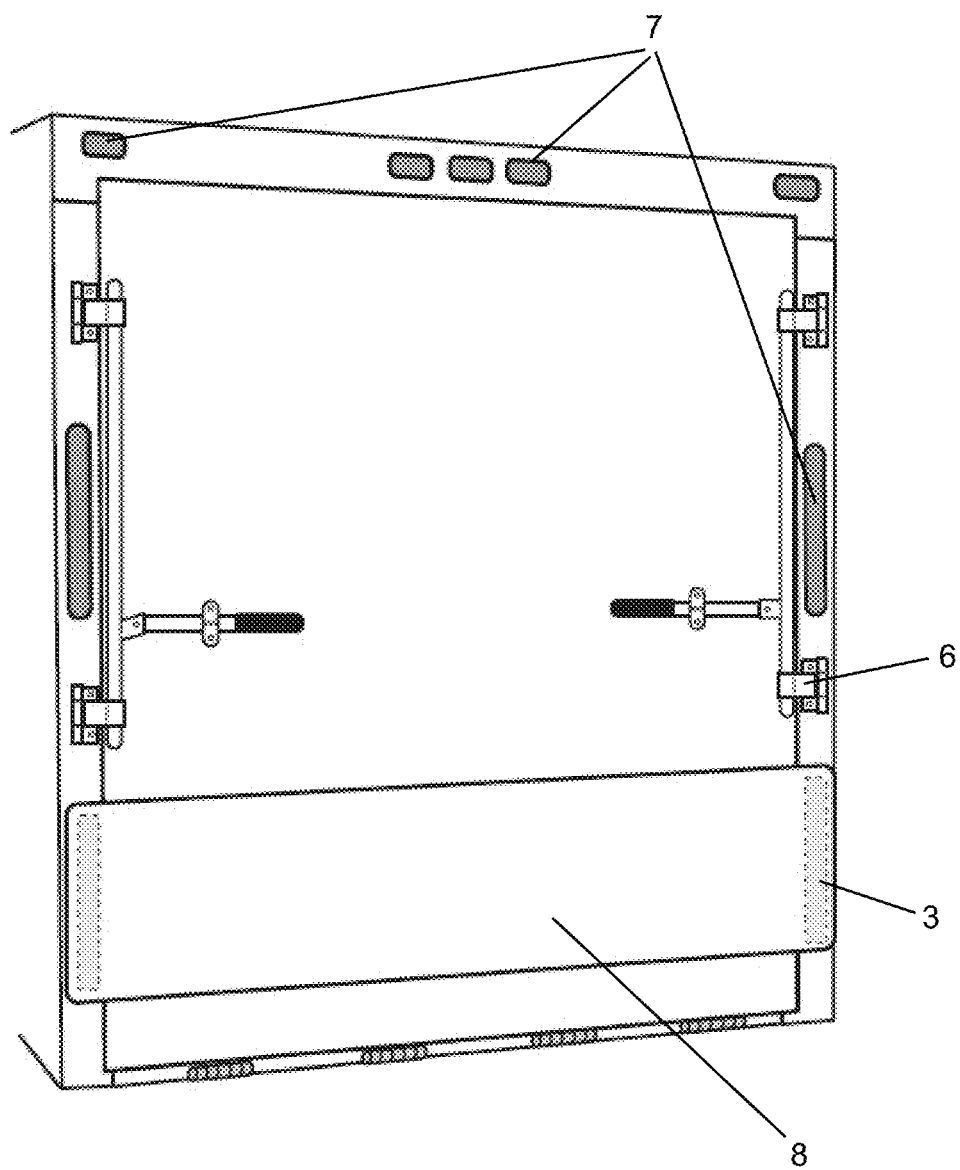
FIG. 4 depicts one embodiment of a closed position perspective view of the embodiment shown in FIG. 3, but with also typical closing/securing mechanism (6) to keep the door in closed position and where blinker/brake/warning lights (7) might be positioned on the rear frame opening of a trailer. In this embodiment, the wing tabs (3) are retrofitted on an existing ramp/door by attaching a plate (8) across the back of the ramp/door.
Figure 5:
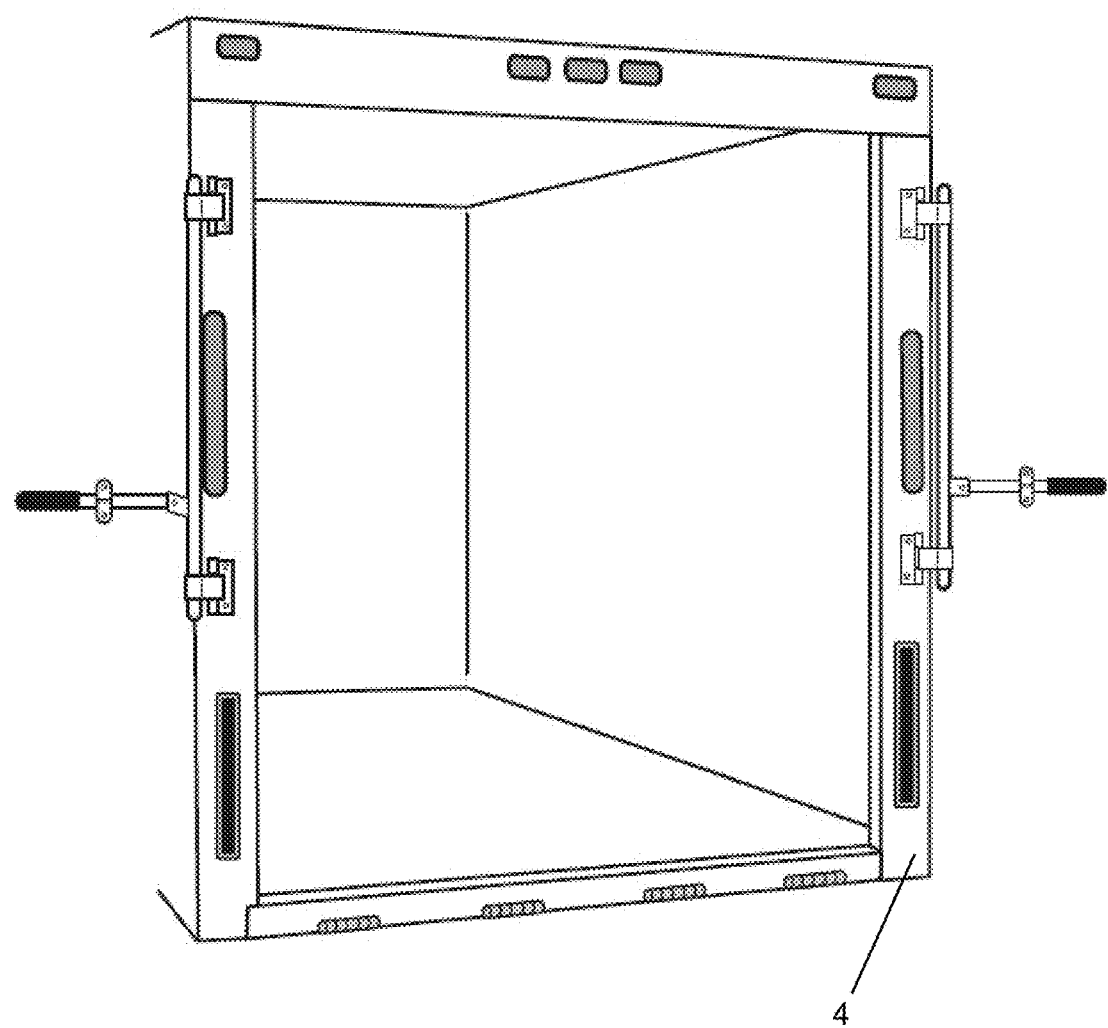
FIG. 5 depicts one embodiment of a rear frame opening of a trailer (4) as would exist in the embodiment depicted in FIG. 4, but with the ramp/door removed.
Figure 6:
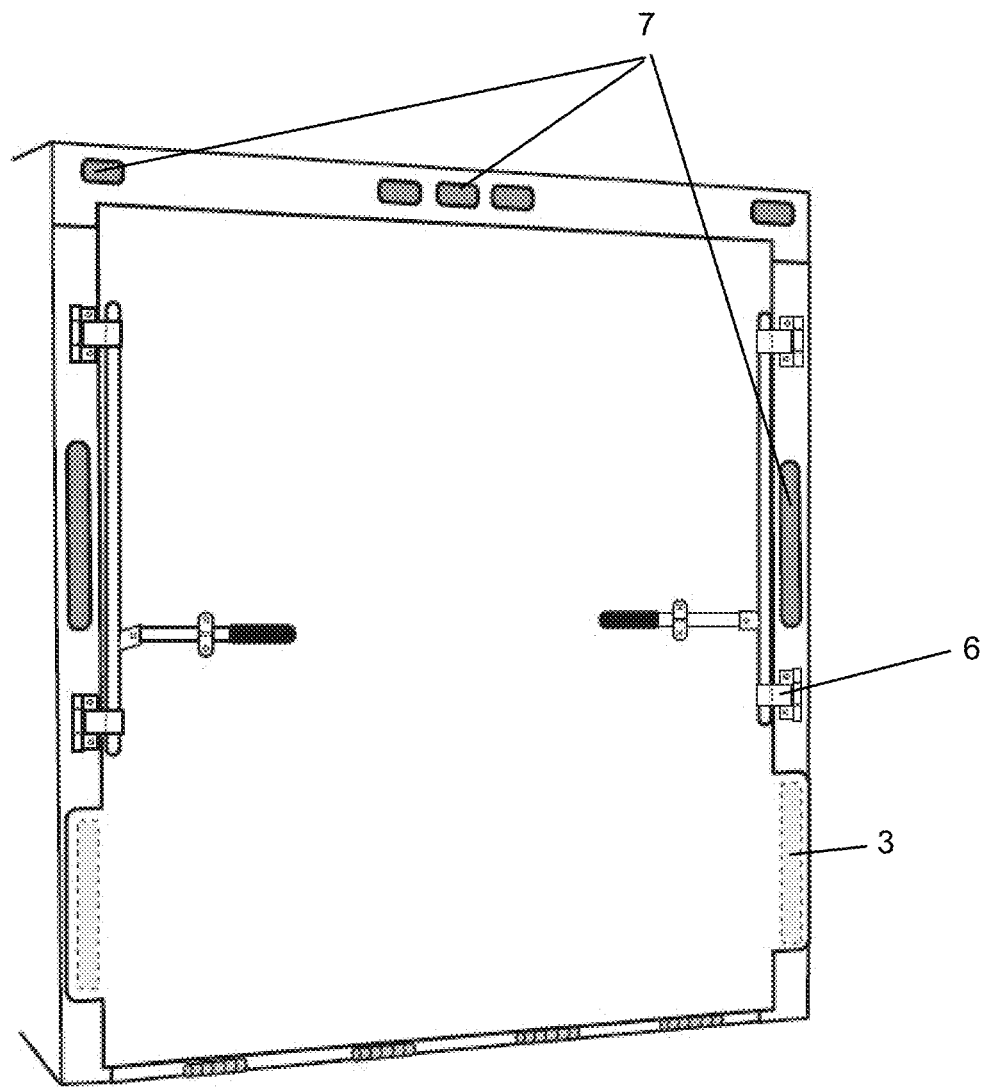
FIG. 6 depicts one embodiment of closed position perspective view of the embodiment shown in FIG. 3, but with also typical closing/securing mechanism (6) to keep the door in closed position and where blinker/brake/warning lights (7) might be positioned on the rear frame opening of a trailer. In this embodiment, the wing tabs (3) are specially made as part of the ramp/door without the need for a plate as shown in FIG. 4.
Figure 7:
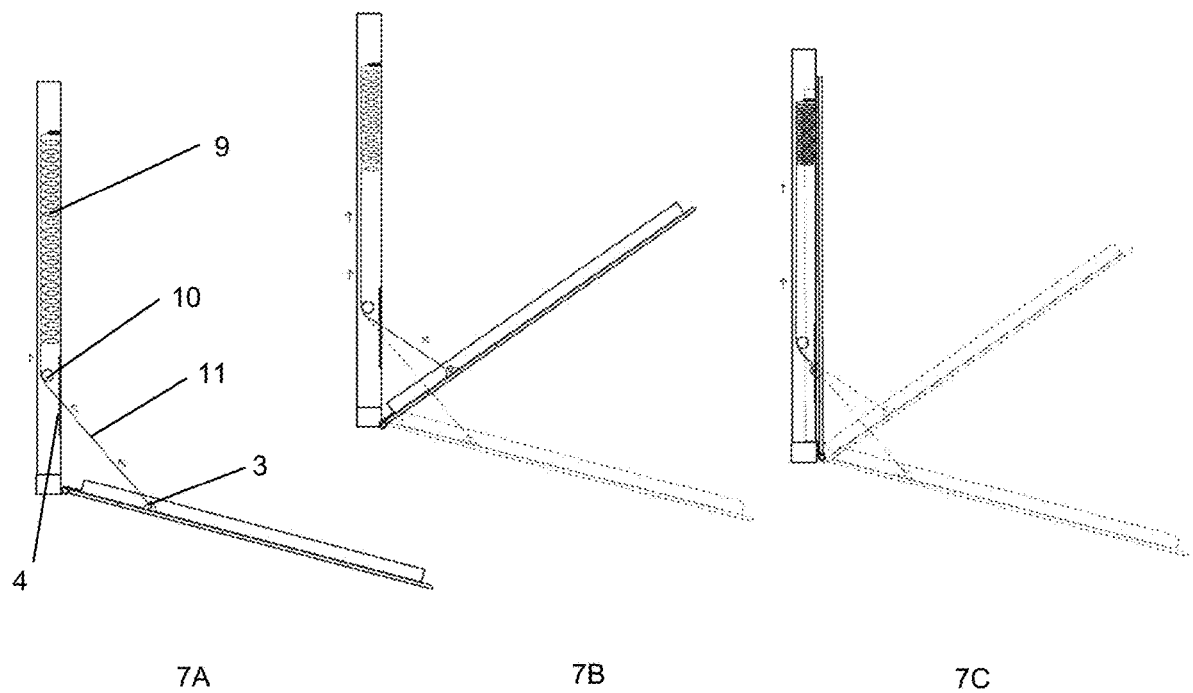
FIGS. 7A, 7B and 7C depict one embodiment of an internal tension spring (9) and pulley (10) system that is fitted inside the rear frame opening of a trailer, wherein the attachment cable (11) attaches at one end to the pull point defined at a positioned wing tab (3) on one end, feeds through the opening of the rear frame of the trailer (4) and attaches at its other end to an end of the tension spring (9). The three related views here depict the door in various positions of opening and closing. In an alternate embodiment, (not shown), the pull point on the wing tab (3), could also contain a pulley. In this embodiment, the pull cable is effectively doubled effectively halving the amount of tension required in the tension spring. This effectively would enable moving the pull point closer to the ramp/door frame opening.
Figure 8:
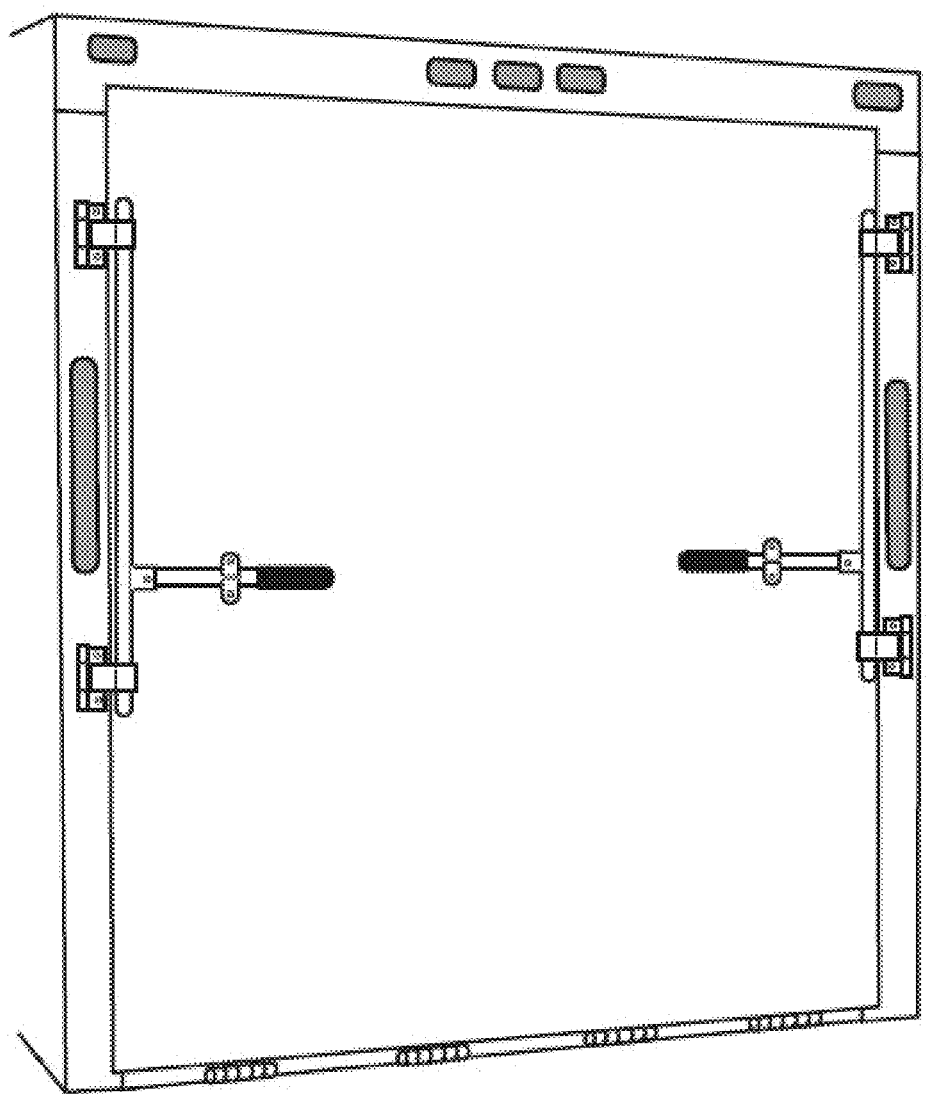
FIG. 8 depicts a prior art version of a rear ramp/door affixed to the rear opening of a trailer in a closed position without the wingtabs. Any cable in this version will have to be fitted into the inside of the rear opening.
Figure 9:
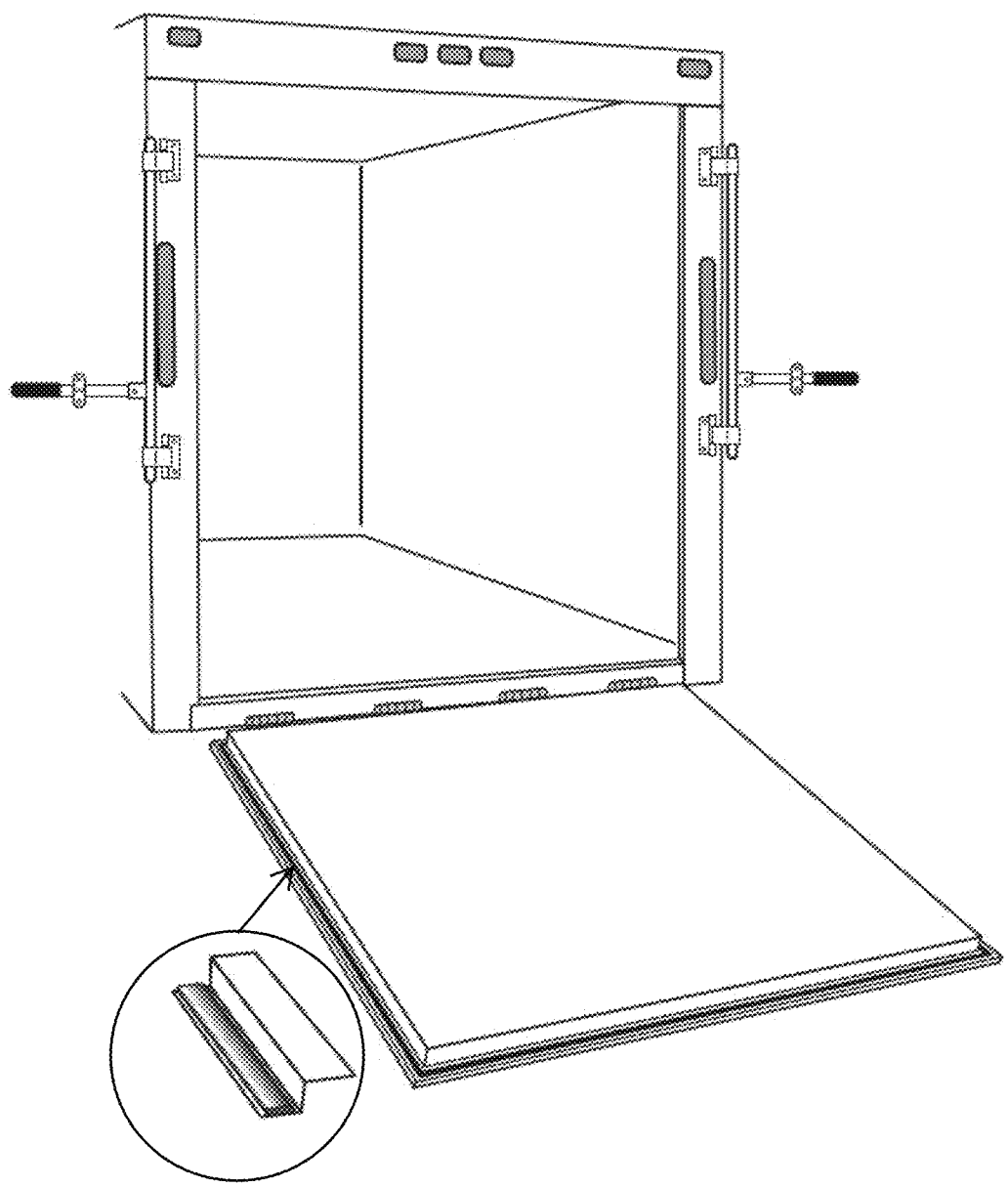
FIG. 9 depicts one embodiment of a ramp/door seal that can be implemented in almost any embodiment of a ramp/door closure. In some embodiments, the seal is a rubber bulb, in others it is a foam rubber, and can be implemented on the inner ramp or the outer door flange.
Figure 10:
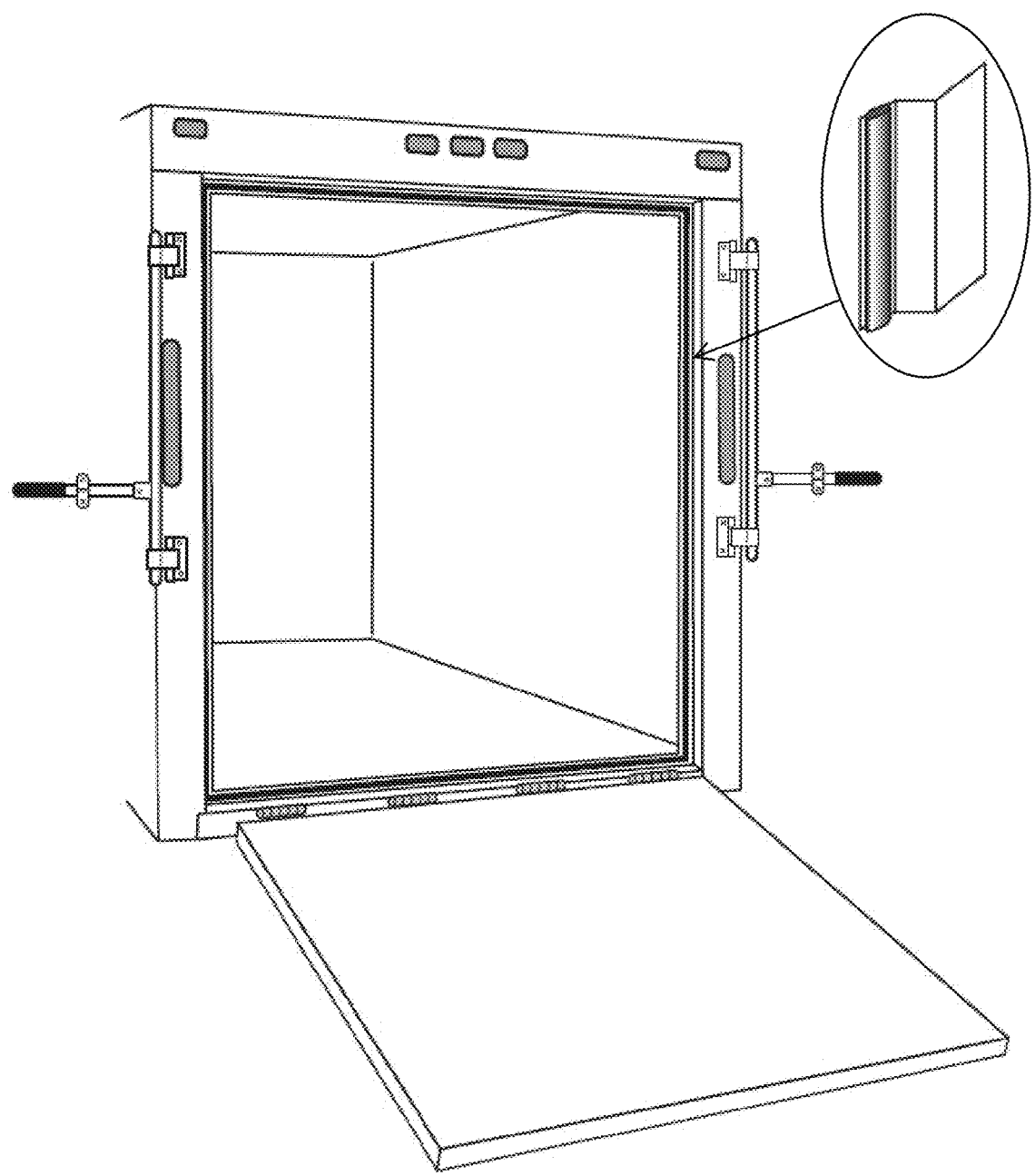
FIG. 10 depicts one embodiment of a ramp/door seal that can be implemented in almost any embodiment of ramp/door closure. In some embodiments, the seal is a rubber bulb, in others it is a foam rubber, and here, it is depicted implemented within the interior of the rear opening of the trailer and not on the ramp/door as in FIG. 9.
Figure 11:
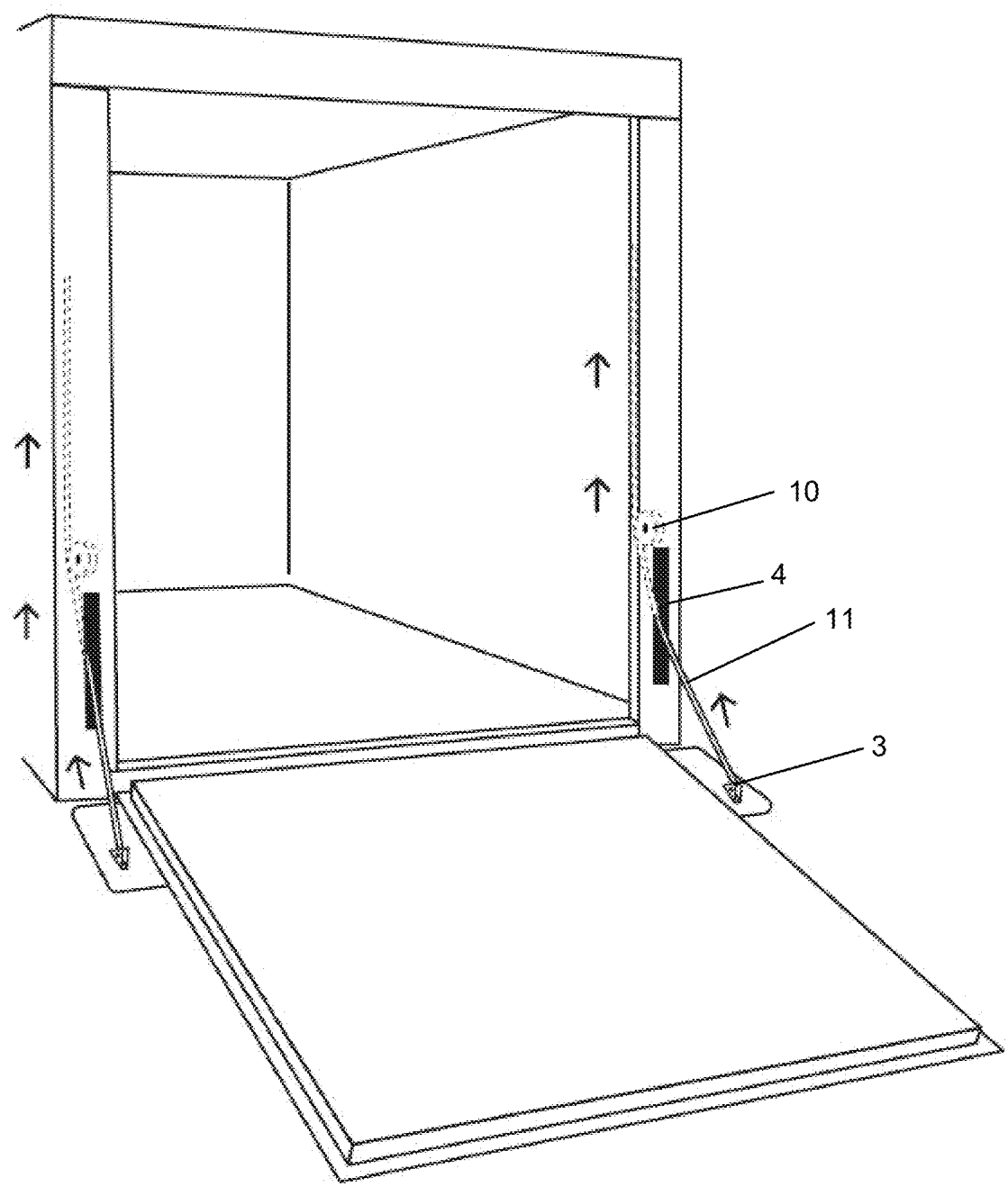
FIG. 11 depicts one embodiment of the outside view of the pull cable (11), pulley (10), rear frame opening (4) that shows the direction of tension pull with the ramp/door in the open position, similar to the views shown in FIG. 7, but from a different perspective (tension spring not shown). Again, (not shown), where a second pulley is employed at the wing tab pull point (3), a doubling of tension cable would effectively either lessen the tension required of the tension spring, and/or allow the pull point (3) to be moved closer to the bottom of the ramp/door. This could be effected by placing a housing on the wing tab and creating a recess within the rear frame opening to accept the housing when closed.
Figure 12:
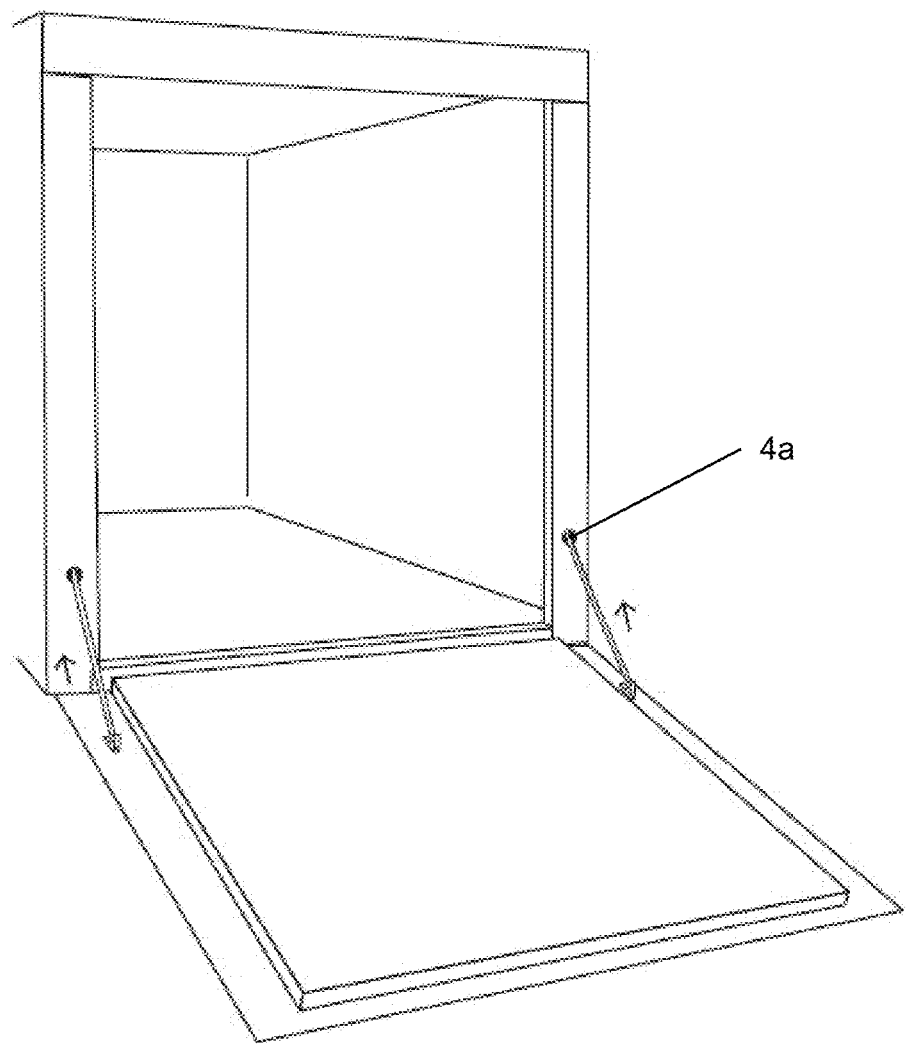
FIG. 12 depicts one embodiment of an alternate configuration of the opening of the rear frame of the trailer (4a) through which the pull cable feeds.
Figure 13:
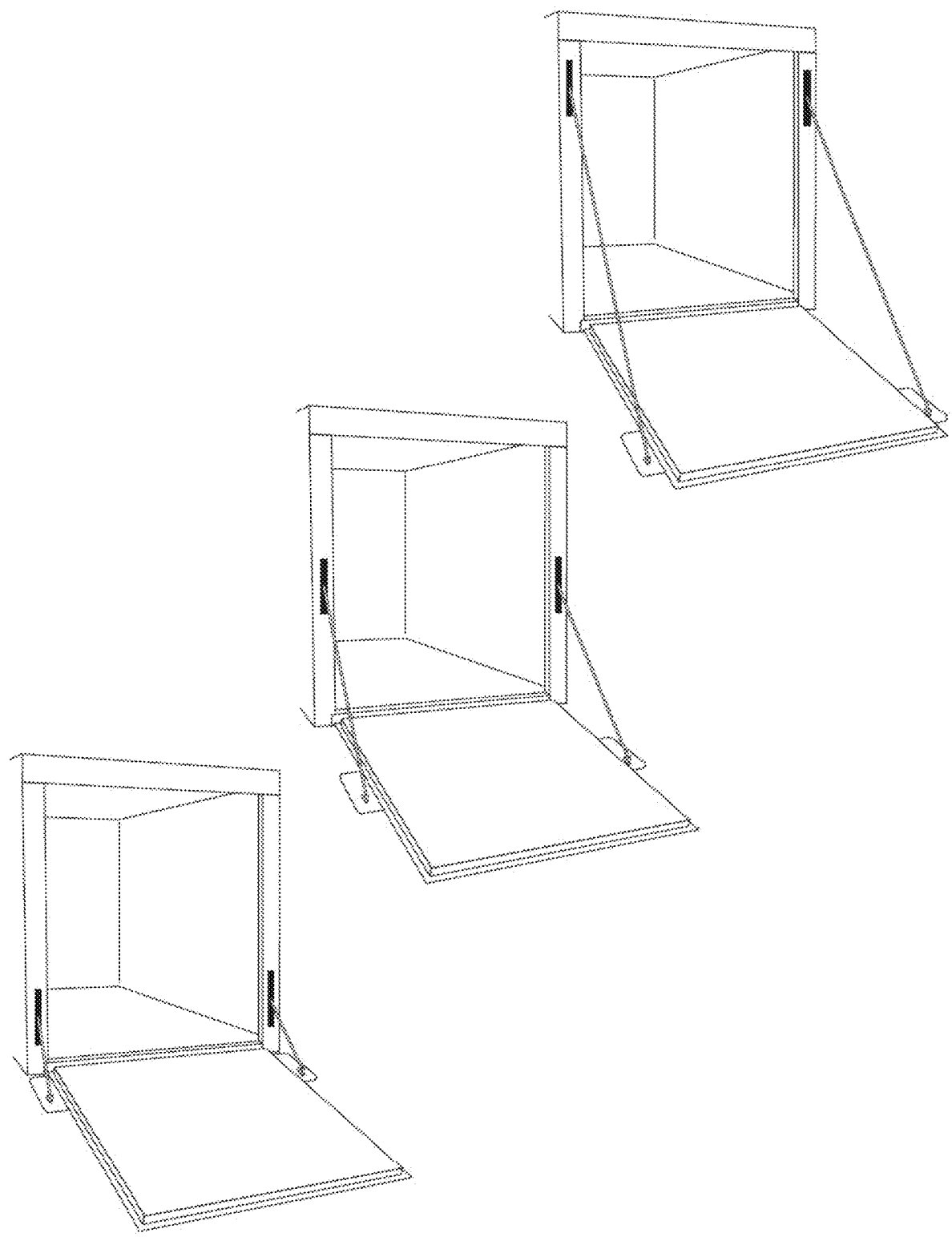
FIG. 13 depicts one embodiment of alternate configurations for locations of the wing tabs along the length of the ramp/door and corresponding locations of the opening of the rear frame of the trailer through which the pull cable would feed. Changing this location changes the required tension spring force as the pull cable tension requirements change, but also increases and decreases the opening footprint obstructions, respectively.
Figure 14:
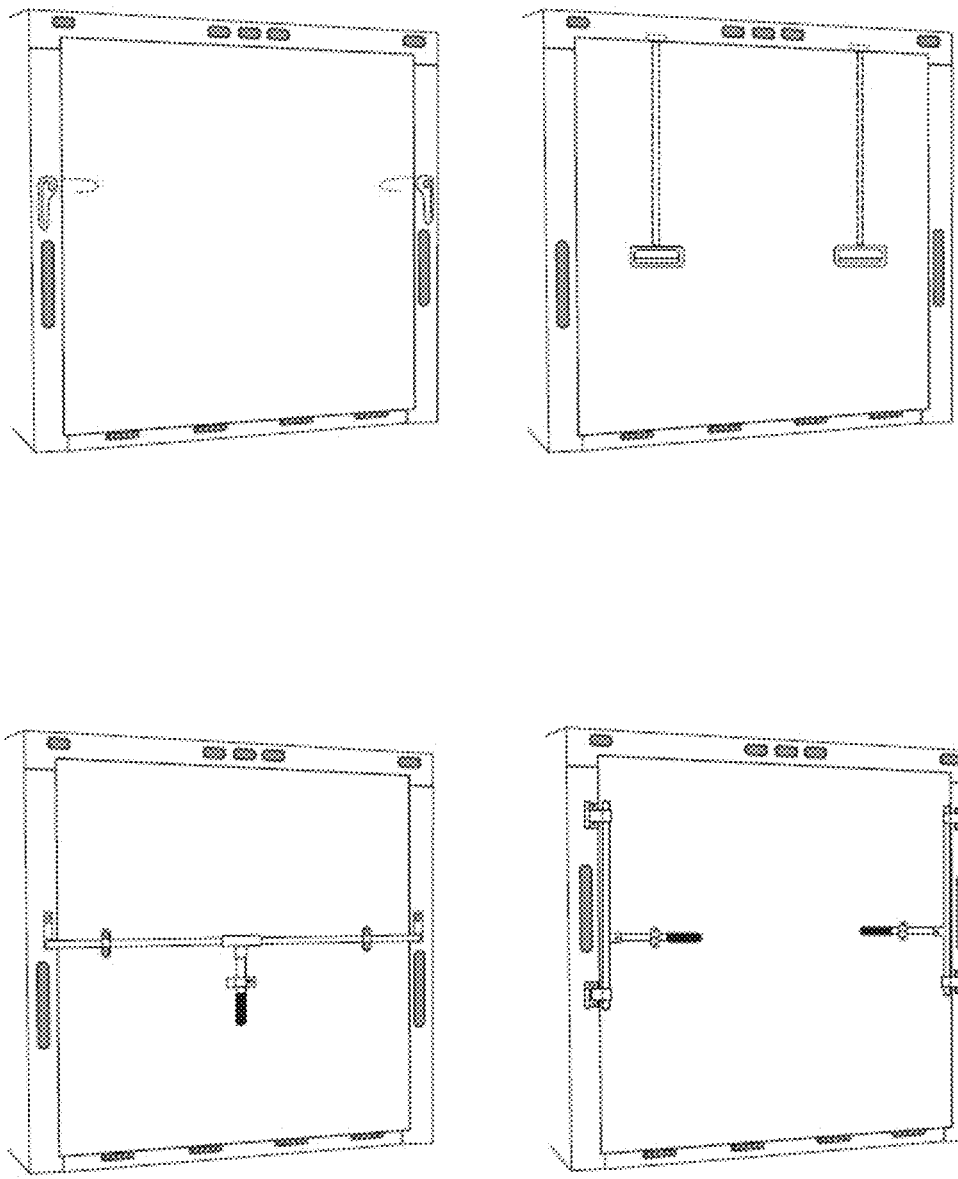
FIG. 14 depicts prior art for alternate configurations of door closure bars for securing the outside of a ramp/door in the closed position and any could be utilized in the various embodiments disclosed herein.
Figure 15:
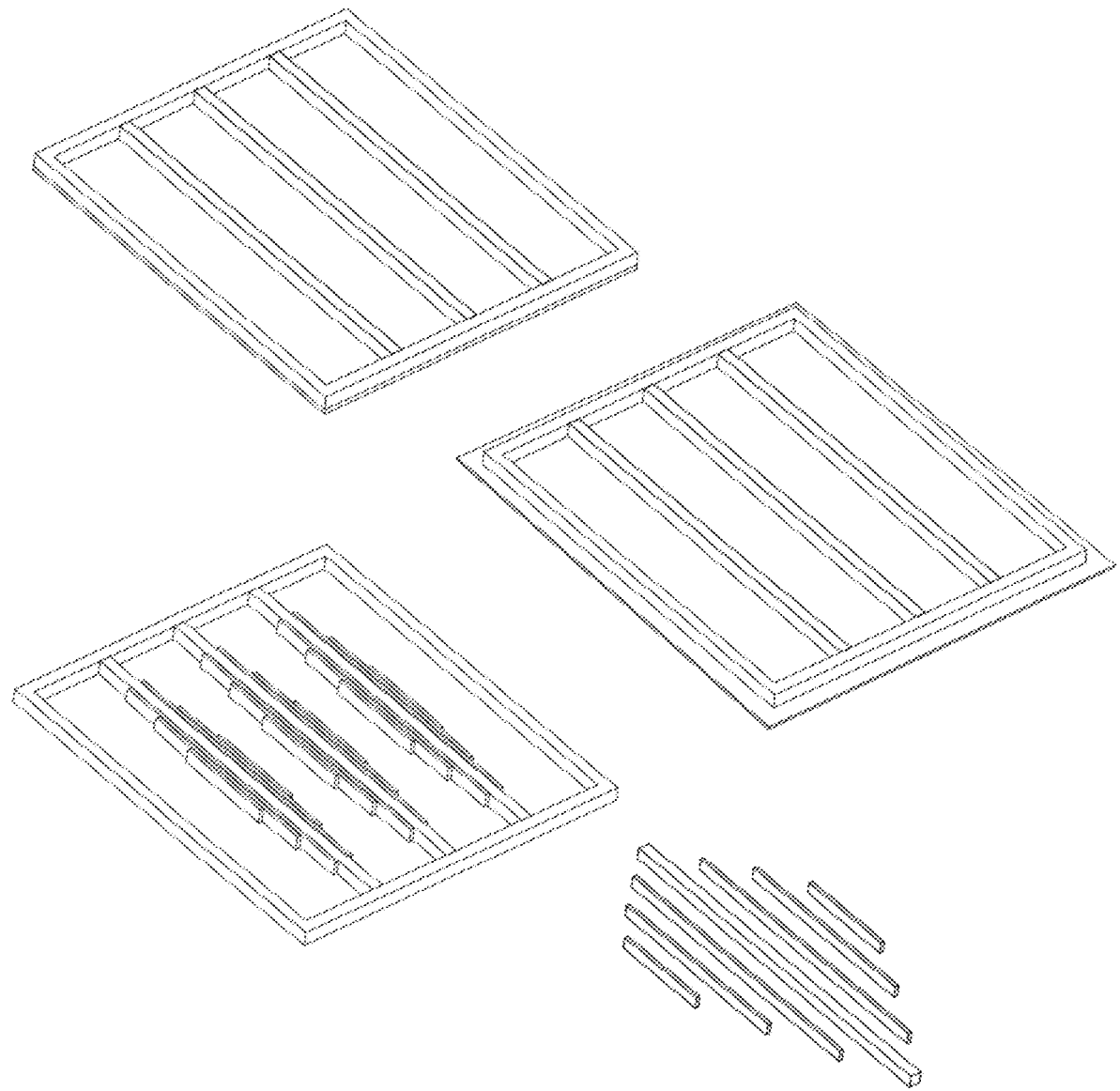
FIG. 15 depicts one embodiment of a frame design for a ramp/door to lessen the weight while maintaining the strength integrity for use as a ramp.
Figure 16:
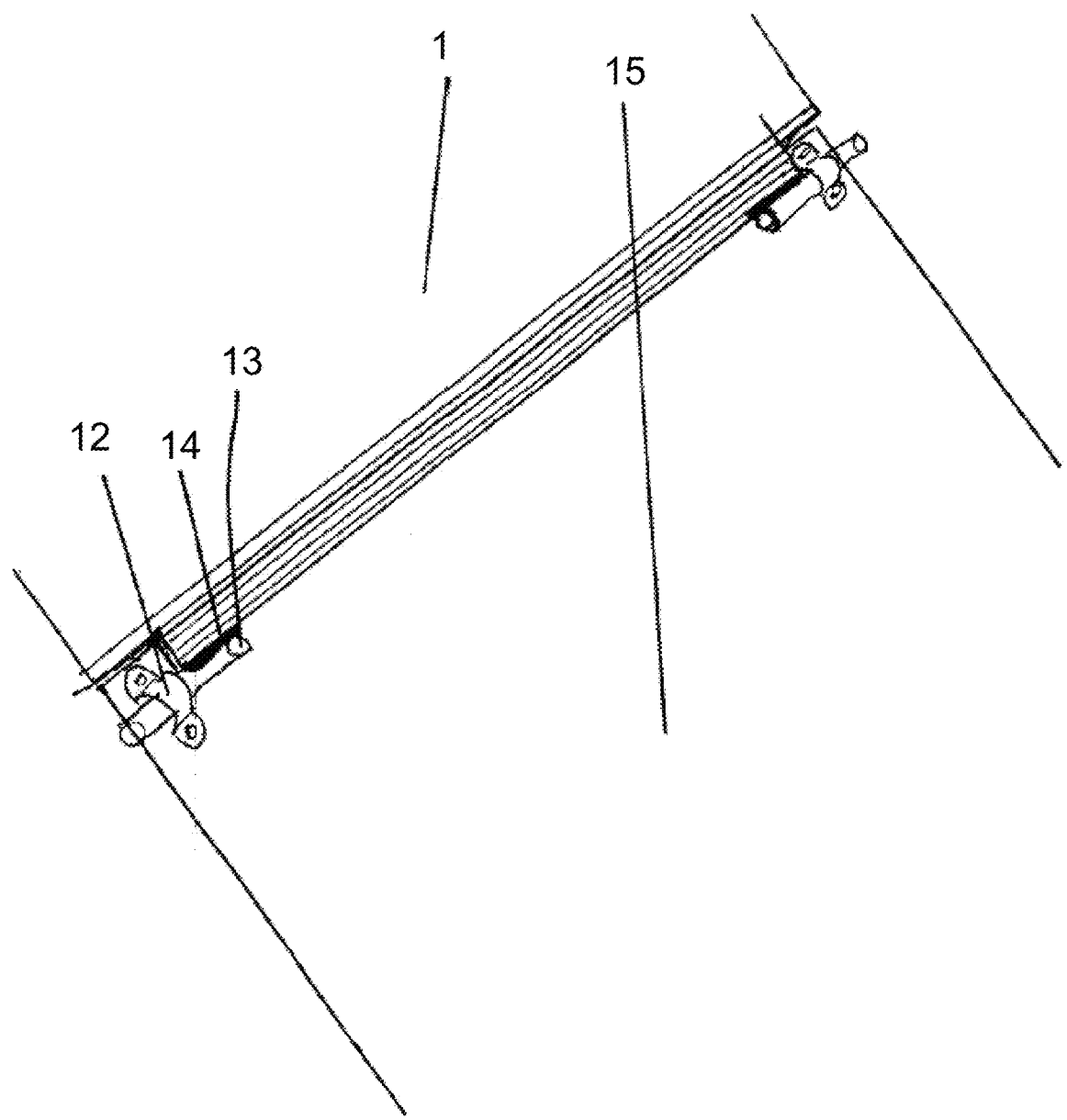
FIG. 16 depicts one embodiment of an alternate type of hinge joinder means connecting a ramp/door (1) to the bed of a trailer (15) via a pin (13) welded at one end to the ramp/door (14) and the other end of said pin (13) secured through a securing clip (12) to the bed of the trailer (15). In this embodiment, there is no weight or force on the hinge connection itself in the open configuration, the bottom edge of the ramp/door (1) resting on the edge of the trailer bed (15).

In one embodiment, existing tension means are re-located to exist completely outside the framework of the rear trailer opening. In an alternate embodiment, existing tension means are re-located to exist completely outside of the opening created by the framework of the rear trailer opening, as illustrated in FIG. 2. In this preferred embodiment, the attachment point of the tension pull cable (11) is attached at a first end on a wing tab (3) that is located at or near the bottom of the ramp/door on either side, fitted through an opening (4) on the lower portion of the framework of the rear trailer opening (but outside and not obstructing the actual opening itself), and then further (as illustrated in FIG.

7A) threaded around a pulley (10) and attached at its other end to a tension spring (9). In this configuration, the pull cable (11) is relocated at its one attachment point on the edge of a ramp/door from the top portion to the lower portion, minimizing it as an obstacle to trip over when the ramp/door is in an open position.

In one embodiment, the pull point that exists on the rear frame of the trailer is slideable, such that during the assist of lifting or opening, the pull point is at a relatively higher point on the height of the rear frame of the trailer, and when in the desired closed or open position, it is slideable to a relatively lower point along the height of the rear frame of the trailer effectively reducing its side obstruction footprint.

In an alternate embodiment, the attachment point of the pull cable (11) to its attachment point at its first end on the wing tab (3), there could exist a pulley facilitating using a lighter pull with a longer throw (extension) on the tension spring (or other counterbalance device utilized).

Each of the mechanisms described herein, for example, a pull cable (11), or a counterbalance device as a tension spring, any known mechanism already in use for these components could be utilized in conjunction with the wing tabs and relocation of the pull point attachment and moving the pull cables outside of where they would normally exist.

As illustrated in the various figures, the other components of a typical rear trailer opening and framework, still possess room for all of the other normal and desired components, such as lighting and securing latches.

Additionally, in one embodiment, a trailer ramp/door (1), when functioning as a ramp, can create a significant load on the hinges (5) used to join the ramp/door (1) to the trailer opening. As part of the overall re-design to create an improved ramp/door design with wing tabs (3) to free up the space in the rear opening, it is also a preferred embodiment to remove the hinges (5) altogether as conventionally used in the prior art, and replace them with a welded pin (13) at the very edge of said ramp/door (1), and secure said pin (13) to the edge of the floor of a trailer bed (15) through a securing pin (12). In this configuration, the bottom edge of the ramp/door (1) rests across the edge of the floor of the trailer bed (15) putting no pressure on the pin (13) in the ramp configuration, the pin (13) being merely a hinge pin around which the ramp/door (1) opens and closes.

EXAMPLES

The present invention is further illustrated, but not limited by, the following examples.

In one embodiment, any combination of principles as outlined above may be implemented to reduce the footprint of a ramp/door lift assist device.

In a preferred embodiment, the teachings herein are best utilized with a typical trailer wherein there is present a downward opening door that when open serves as a ramp. In this configuration, the ramp/door is hinged at the bottom, but typically is desired to be installed with a counterbalance mechanism to assist with opening and closing the ramp/door, i.e., making it so that it doesn't just fall open with all of its natural weight, and making it easier to close with one operator. Typically, this was accomplished with a pull cable attached to a spring mechanism creating a tension located inside the trailer or in the framework roof (similarly to a garage door). However, this pull cable, to be most effective, was attached at its first end near the top of the ramp/door and at its second end, directly to the tension spring or counterbalance mechanism. This configuration results in an obstructed trailer opening.

Implementing the teachings herein, the attachment point of the pull cable at its first end is moved both outward and downward, reducing its footprint as an obstruction in the trailer opening. To accomplish this, wing tabs are added to the ramp/door at a desired location. Then, the counterbalance mechanism is re-located inside the framework of the rear trailer opening and a specialized opening within the lower portion of the framework and a pulley are implemented to route the pull cable effectively from its attachment point at its first end on the wing tabs, to its attachment point on its second end to the counterbalance mechanism. Rubber flaps or other known mechanisms can be utilized at the opening to reduce the entrance of contaminants from the elements into the interior of the framework of the rear trailer opening.

This disclosure is not limited by any particular type of latching device to hold the ramp/door in a desired open or closed position, or by any particular type of known tension means or counter-weight means and the scope of the claims should not be read as so limited as any may be employed under the principles as disclosed herein.

Publications cited throughout this document are hereby incorporated by reference in their entirety. Although the various aspects of the invention have been illustrated above by reference to examples and preferred embodiments, it will be appreciated that the scope of the invention is defined not by the foregoing description but by the following claims properly construed under principles of patent law.

Each and every feature described herein, and each and every combination of two or more of such features, is included within the scope of the present invention provided that the features included in such a combination are not mutually exclusive.

What is claimed is:

1. A ramp/door tension device, comprising:
   at least one flange, located along, and extended outward in substantially the same horizontal plane from, an edge of a ramp/door creating a first pull point for a pull cable, and a second pull point located along an edge of a trailer rear framework for each of at least one said flange; and
   said pull cable affixed at one end at said first pull point at each of said at least one flange and affixed at its other end to said second pull point wherein a tension means is further provided which provides tension to said pull cable.

2. The ramp/door tension device of claim 1, wherein there are two flanges, one at either side of said ramp/door.

3. The ramp/door tension device of claim 2, wherein the flange affixed to either or both of the edges of said ramp/door are slideable along said edge.

4. The ramp/door tension device of claim 1 further comprising at least two hinge pins welded, at least one to either side of the bottom edge of said ramp/door configured to join said ramp/door to the bottom edge of an opening of a trailer through securing clips.

* * * * *